(12) United States Patent
Shimizu et al.

(10) Patent No.: US 6,208,396 B1
(45) Date of Patent: Mar. 27, 2001

(54) NORMALLY WHITE MODE TWISTED NEMATIC LIQUID CRYSTAL DISPLAY DEVICE HAVING IMPROVED VIEWING ANGLE CHARACTERISTICS

(75) Inventors: Akiko Shimizu, Ibaraki; Takahiro Hishinuma, Toyonaka; Koji Higashi, Ibaraki, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 08/957,780

(22) Filed: Oct. 24, 1997

Related U.S. Application Data
(60) Provisional application No. 60/033,587, filed on Dec. 20, 1996, and provisional application No. 60/033,588, filed on Dec. 20, 1996.

(30) Foreign Application Priority Data

Oct. 25, 1996 (JP) ..................................................... 8-284091
Oct. 25, 1996 (JP) ..................................................... 8-284092

(51) Int. Cl.⁷ ......................... G02F 1/1347; G02F 1/1335
(52) U.S. Cl. ........................... 349/119; 349/118; 349/76; 349/96; 349/120
(58) Field of Search ........................... 349/120, 117–119, 349/76, 96

(56) References Cited

U.S. PATENT DOCUMENTS

| 4,825,006 | 4/1989 | Otera et al. ............................. 568/32 |
| 4,876,400 | 10/1989 | Otera et al. ........................... 568/824 |

(List continued on next page.)

FOREIGN PATENT DOCUMENTS

| 0187259B1 | 7/1986 | (EP) . |
| 0676660A1 | 10/1995 | (EP) . |

| 58-52267 | 3/1983 | (JP) . |

(List continued on next page.)

OTHER PUBLICATIONS

Otera et al., Chemistry Letters, pp. 1883–1885 (1985).
Babler et al, J. Org. Chem., vol. 44, No. 10, pp. 1716–1717 (1979).

(List continued on next page.)

Primary Examiner—James A. Dudek
Assistant Examiner—Julie Ngo
(74) Attorney, Agent, or Firm—Birch, Stewart, Kolasch & Birch, LLP

(57) ABSTRACT

A normally white mode twisted nematic liquid crystal display devices having significantly improved viewing angle characteristics of display contrast and gray scale inversion comprising an about 90° twisted nematic liquid crystal cell and a first and a second light polarizing film separately disposed on two sides of said liquid crystal cell, a first and a second optical compensation layer which each comprises at least one optical compensation layer and has almost no refractive index anisotropy in-plane of the optical compensation layer A and has a characteristic wherein a refractive index in the thickness direction of the optical compensation layer A is lower than that in-plane of the optical compensation layer A, and a first and second optical compensation layer B, which each comprises at least one optical compensation layer and has optically positive refractive index anisotropy and has a characteristic wherein a principal optic axis of the optical compensation layer B is tilted 20 to 70° from the normal direction of the optical compensation layer B, wherein said liquid crystal cell, said light polarizing films and said optical compensation layers A and B are laminated in the following order: said first light polarizing film, said first optical compensation layer A, said first optical compensation layer B, said liquid crystal cell, said second optical compensation layer B, said second optical compensation layer A and said second light polarizing film.

3 Claims, 2 Drawing Sheets

U.S. PATENT DOCUMENTS

| | | | | |
|---|---|---|---|---|
| 5,344,916 | * | 9/1994 | Harris et al. | 528/353 |
| 5,504,603 | | 4/1996 | Winker et al. | 359/73 |
| 5,506,706 | * | 4/1996 | Yamahara et al. | 359/73 |
| 5,528,400 | * | 6/1996 | Arakawa | 359/73 |
| 5,638,200 | * | 6/1997 | Xu | 349/117 |
| 5,677,747 | * | 10/1997 | Ishikawa et al. | 349/76 |
| 5,699,137 | * | 12/1997 | Kiskimoto | 349/119 |
| 5,777,709 | * | 7/1998 | Xu | 349/120 |
| 5,883,685 | * | 3/1999 | Mazaki et al. | 349/117 |

FOREIGN PATENT DOCUMENTS

| | | |
|---|---|---|
| 4-113301 | 4/1992 | (JP) . |
| 4-120512 | 4/1992 | (JP) . |
| 5-080323 | 4/1993 | (JP) . |
| 9610773 | 4/1996 | (WO) . |

OTHER PUBLICATIONS

Fischli et al., Helvetica Chimica Acta, vol. 59, Fasc. 2, pp. 397–405 (1976).

Ivanov et al., Synthesis, pp. 732–734 (1979).

* cited by examiner

NORMALLY WHITE MODE TWISTED NEMATIC LIQUID CRYSTAL DISPLAY DEVICE HAVING IMPROVED VIEWING ANGLE CHARACTERISTICS

This application claims benefit of provisional application Ser. Nos. 60/033,587, filed Dec. 20, 1996 and 60/033,588, filed Dec. 20, 1996.

BACKGROUND OF THE INVENTION

1. Field of the Invention

The present invention relates to a liquid crystal display device improved in viewing angle characteristics, and particularly in viewing angle characteristics of display contrast and gray scale inversion.

2. Description of Related Art

The most widely used liquid crystal display device (hereinafter referred to as LCD) at present is a normally white (hereinafter referred to as NW) mode twisted nematic LCD (hereinafter referred to as TN-LCD). In this NW mode TN-LCD, a nematic liquid crystal is held between a pair of glass substrates having transparent electrodes. The nematic liquid crystal has a helical axis in the normal direction of the pair of glass substrates, and also has an alignment structure characterized in that the twisted angle of the axis is about 90°. This combination of the nematic liquid crystal and the pair of glass substrates forms a liquid crystal cell. The liquid crystal cell is held between a pair of linear polarizing films disposed so that the absorption axes thereof are orthogonal to each other.

When no voltage is applied to the NW mode TN-LCD, linearly polarized incident light is rotated by 90° by the optical rotatory power of the liquid crystal cell and delivered, thereby generating a white condition. When voltage is applied, liquid crystal molecules rise with respect to the glass substrates, and the optical rotatory power is lost. The linearly polarized incident light is delivered while keeping its condition, thereby generating a black condition. The white condition, the black condition and an intermediate condition there between are used to perform gray scale display.

However, the nematic liquid crystal for the LCD has a bar-shaped molecular structure, and exhibits positive refractive index anisotropy having a high refractive index in the direction of the molecular axis. Because of the phase difference due to the refractive index anisotropy of the liquid crystal, the polarized condition of light obliquely passing through the LCD changes in a direction different from the normal direction of the LCD. As a result, when the display on the LCD is viewed from an angle different from the normal direction of the LCD, improper viewing angle characteristics are generated; that is, the contrast of the display is lowered, and the gray scale display is inverted.

Since this viewing angle characteristics are caused by the refractive index anisotropy of the liquid crystal molecules, investigation for its improvements have been conducted by using a phase retarder film exhibiting refractive index anisotropy opposite to that of the liquid crystal so as to compensate for a phase difference due to the refractive index anisotropy of liquid crystal molecules.

In the improvements in the viewing angle characteristics, a significant effect can be obtained by improving the viewing angle characteristics in the black display condition, namely in the voltage application condition. In the voltage application condition, the liquid crystal molecules are aligned in a direction nearly perpendicular to the glass substrates. By regarding this condition as a positive index anisotropic substance having an optical axis in the normal direction of the glass substrate, a method of using a phase retarder film having an optical axis in the normal direction of the film and having negative refractive index anisotropy as a phase retarder film for compensating for the positive index anisotropy has been disclosed in Japanese Laid-open Patent Publication Nos.2-015239, 3-103823 and the like. However, in an actual LCD, since the liquid crystal molecules remain tilted near the glass substrate even in the voltage application condition because of the restraint force of the alignment film of the substrate, it is difficult to sufficiently compensate for the light polarization condition caused by the liquid crystal cell by using the phase retarder film having an optical axis in the normal direction of the film and having negative refractive index anisotropy.

In order to also compensate for the tilted liquid crystal molecules, a method of using a phase retarder film having an optical axis in a direction tilted from the normal direction of the film and having negative refractive index anisotropy has been disclosed in Japanese Laid-open Patent Publication Nos. 63-239421, 6-214116 and the like. However, although these methods can improve the compensation condition for the liquid crystal cell being in the voltage application condition, compensation becomes insufficient in the intermediate gray scale display condition wherein the tilted liquid crystal portions increase and take more complicated alignment configurations because of lower application voltage. Therefore, it is difficult to improve the gray scale inversion phenomenon, although the viewing angle characteristic of display contrast can be improved. As a result, only incomplete viewing angle characteristics can be obtained.

Japanese Laid-open Patent Publications Nos. 5-080323 and 7-306406 and WO96/10773 describe that the viewing angle characteristics can also be improved by using a phase retarder plate having an optical axis tilted from the normal direction of the film although having the same positive refractive index anisotropy as the liquid crystal has. Although showing that the use of the phase retarder plate having positive refractive index anisotropy and having an optical axis tilted from the normal direction of the film is effective for curbing gray scale inversion of the liquid crystal cell, these publications make no concrete references to manners in which the phase retarder plate is used to achieve the curbing effect. With the modes described in these publications, TN-LCDs cannot be obtained having significantly improved viewing angle characteristics of both display contrast and gray scale inversion.

Thus, for the optical compensation plate used for improving viewing angle characteristics of the TN-LCD, no plate has been found that is capable of significantly improving viewing angle characteristics of not only display contrast but also gray scale inversion.

In view of these circumstances, the inventors assiduously made examinations to find that TN-LCDs having significantly improved viewing angle characteristics of both display contrast and gray scale inversion are obtained by combining a layer (optical compensation layer B) comprising at least one optical compensation layer having optically positive refractive index anisotropy and having a characteristic wherein the principal optic axis thereof is tilted 20 to 70° from the normal direction of the film and a layer (optical compensation layer A) comprising at least one optical compensation layer having almost no refractive index anisotropy in-plane of the film and having a characteristic wherein the refractive index in the thickness direction of the film is lower than that in-plane of the film, or further a layer (optical compensation layer C) comprising at least one uniaxial optical compensation layer having optically positive refractive index anisotropy and by laminating these optical compensation layers having different characteristics in a specific order with respect to the polarizing films and the liquid crystal cell, namely in the order of, on both sides of the liquid crystal cell from the side of the liquid crystal cell, the optical compensation layer B and the optical compensation layer A, or the optical compensation layer C, the optical compensation layer B and the optical compensation layer A, so that the present invention has been completed.

SUMMARY OF THE INVENTION

An object of the present invention is to provide a TN-LCD having significantly improved viewing angle characteristics of display contrast and gray scale inversion.

The present invention relates to the followings.

(1) A normally white mode liquid crystal display device comprising an about 90° twisted nematic liquid crystal cell and two light polarizing films disposed on both sides of the cell, wherein a layer (optical compensation layer A) comprising at least one optical compensation layer having almost no refractive index anisotropy in-plane of the film and having a characteristic wherein a refractive index in the thickness direction of the film is lower than that in-plane of the film, a layer (optical compensation layer B) comprising at least one optical compensation layer having optically positive refractive index anisotropy and having a characteristic wherein the optical axis thereof is tilted 20 to 70° from the normal direction of the film, a polarizing film, and a liquid crystal cell are laminated in the following order: the polarizing film, the optical compensation layer A, the optical compensation layer B, the liquid crystal cell, the optical compensation layer B, the optical compensation layer A and the polarizing film.

(2) A liquid crystal display device wherein a layer (optical compensation layer C) comprising at least one uniaxial optical compensation layer having optically positive refractive index anisotropy is further laminated between the optical compensation layer B and the liquid crystal cell of the liquid crystal display device described in the above (1) in the following order: said polarizing film, said optical compensation layer A, said optical compensation layer B, said optical compensation layer C, said liquid crystal cell, said optical compensation layer C, said optical compensation layer B, said optical compensation layer A and said polarizing film.

BRIEF DESCRIPTION OF THE DRAWINGS

In FIGS. 1 and 2, the upper side of the liquid crystal cell is the light outgoing side, and the lower side of the liquid crystal cell is the light incident side.

DETAILED DESCRIPTION OF THE INVENTION

Figure 1:
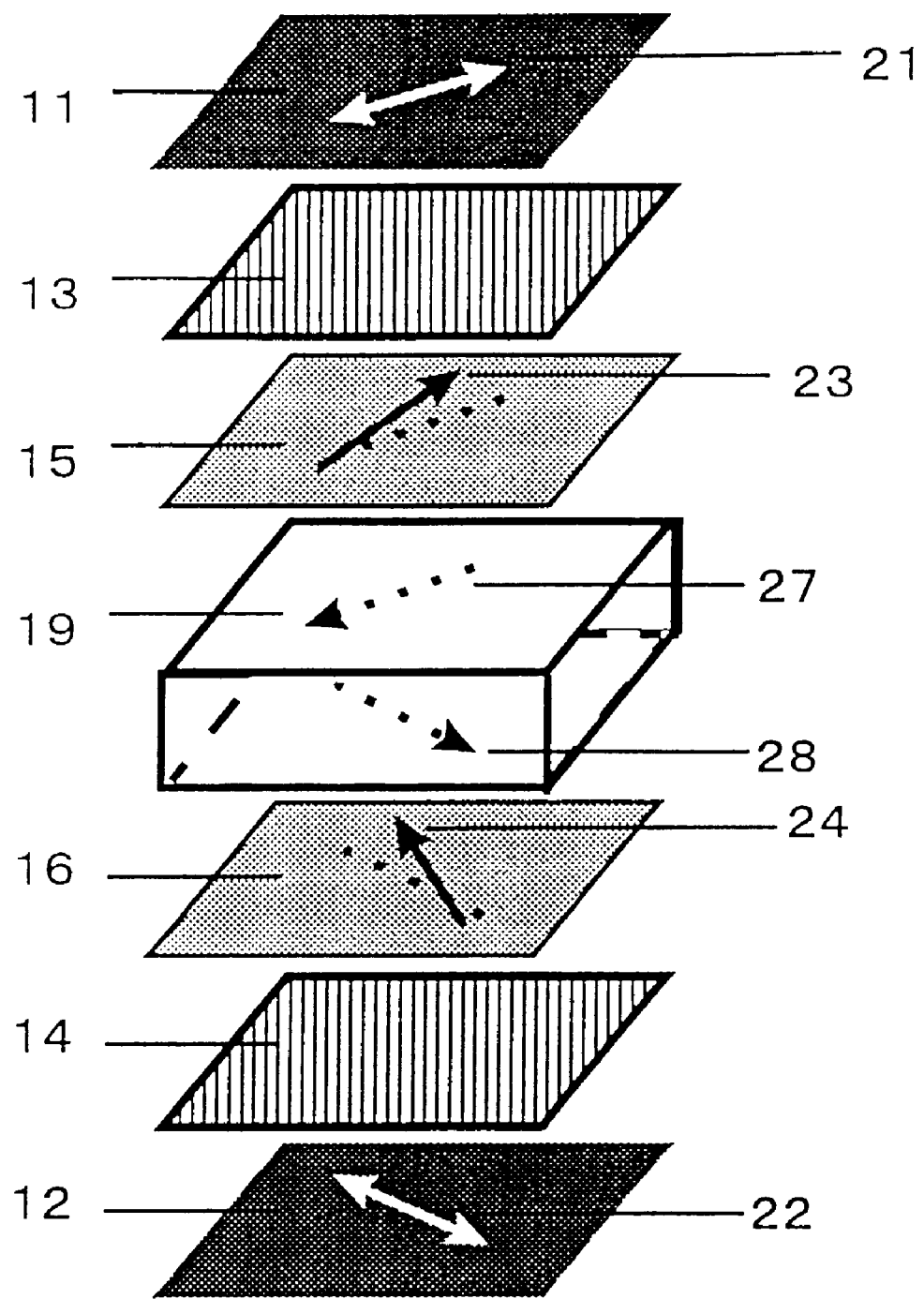
FIG. 1 is a schematic, expanded view of the liquid crystal display in Example 1, which shows the optical axis directions of each optical compensation layer, the rubbing directions of the substrates of the liquid crystal cell, and the absorption axes of light polarizing films of upper and lower sides of the liquid crystal display.

In the present invention, the layer (optical compensation layer A) comprising at least one optical compensation layer having almost no refractive index anisotropy in-plane of the film and having a characteristic wherein the refractive index in the thickness direction of the film is lower than that in-plane of the film is not limited to a specific one as long as it satisfies the requirements for necessary optical characteristics. For example, it is possible to use a transparent polymer cast film having a refractive index structure wherein the retardation in-plane of the film is low due to the alignment of polymers at the time film formation by the solvent cast method and having a refractive index ($n_t$) in the thickness direction of the film is lower than the average refractive index ($n_p$) in-plane of the film; a biaxial streched film of transparent polymers; a phase retarder using inorganic layered compound, disclosed in Japanese Laid-open Patent Publication No. 5-196819; a compensator formed by alternately laminating thin films made of substances having different refractive indexes, disclosed in Japanese Laid-open Patent Publication No.5-249457; and the like.

The optical characteristics of the optical compensation layer A are determined by the retardation value ($R_A$) in-plane and the retardation value ($R_A'=(n_p-n_t)\times d$, d: the thickness of the film) in the thickness direction. These values are appropriately selected depending on the optical characteristics and the finally required viewing angle characteristics of the liquid crystal cell to be used. Generally, these values are used in the following ranges: $R_A=0$ to 100 nm and $R_A'=50$ to 250 nm, preferably $R_A=0$ to 50 nm and $R_A'=50$ to 200 nm.

In the present invention, the layer (optical compensation layer B) comprising at least one optical compensation layer having optically positive refractive index anisotropy and having a characteristic wherein the optical axis is tilted 20 to 70° from the normal direction of the film is not limited to a specific one as long as it satisfies the requirements for necessary optical characteristics. For example, it is possible to use a tilted alignment sheet aligned by subjecting thermoplastic resin to the application of an electric or magnetic field or different circumferential speed rolling, disclosed in Japanese Laid-open Patent Publication Nos. 4-120512 and 6-222213; a tilted alignment layer of a liquid crystal polymer aligned and secured by application of an electric or magnetic field or by alignment control using an alignment film, disclosed in Japanese Laid-open Patent Publication Nos. 7-152035 and 7-191216; or an optical anisotropic layer made by oblique vacuum deposition of an inorganic dielectric substance or the like on a transparent substance, disclosed in Patent Publication No. WO96/10773; and the like.

The optical characteristics of the optical compensation layer B are determined by the tilting angle ($\theta$) of the principal optic axis from the normal direction of the liquid crystal cell substrate and a retardation value ($R_B$) measured from the normal direction of the optical compensation layer. These values are appropriately selected depending on the optical characteristics and the finally required viewing angle characteristics of the liquid crystal cell to be used. Generally, these values are used in the following ranges: $\theta=20$ to 70° and $R_B=10$ to 200 nm, preferably $\theta=25$ to 45° and $R_B=20$ to 50 nm.

The two kinds of optical compensation layers having different characteristics are laminated between one of the polarizing films and the liquid crystal cell and also laminated between the liquid crystal cell and the other polarizing film; in other words, these layers, plates and cell are laminated in the following order: the polarizing film, the optical compensation layer A, the optical compensation layer B, the liquid crystal cell, the optical compensation layer B, the optical compensation layer A and the polarizing film.

As described above, each of the optical compensation layers A and B may be a single layer or may be, if necessary, composed of a plurality of layers.

In the present invention, the viewing angle characteristics may be further improved by laminating, in addition to the optical compensation layers A and B, a layer (optical compensation layer C) comprising at least one uniaxial optical compensation layer having optically positive refractive index anisotropy between the optical compensation layer B and the liquid crystal cell.

In the present invention, the layer (optical compensation layer C) comprising at least one uniaxial optical compensation layer having optically positive refractive index anisotropy is not limited to a specific one as long as it satisfies the requirements for necessary optical characteristics. For example, it is possible to use a uniaxial stretched film made of thermoplastic resin and generally used as a phase retarder, and a homogeneous alignment layer of a liquid crystal substance, and the like.

The optical characteristics of the optical compensation layer C are determined by the retardation value ($R_C$) in-plane of the compensation layer. This value is appropriately selected depending on the optical characteristics and the finally required viewing angle characteristics of the liquid crystal cell to be used. Generally, this value is used in the following range: $R_C$=10 to 100 nm, preferably $R_C$=30 to 70 nm.

The three kinds of optical compensation layers having different characteristics are laminated between one of the polarizing films and the liquid crystal cell and also laminated between the liquid crystal cell and the other polarizing film; in other words, these layers, plates and cell are laminated in the following order: the polarizing film, the optical compensation layer A, the optical compensation layer B, the optical compensation layer C, the liquid crystal cell, the optical compensation layer C, the optical compensation layer B, the optical compensation layer A and the polarizing film. As described above, each of the optical compensation layers A, B and C may be a single layer or may be, if necessary, composed of a plurality of layers.

In the lamination structure of the optical compensation layers of the present invention, the effect of improving the viewing angle characteristics significantly depends on the relationship between the rubbing direction of the substrates on the light incident side and the light outgoing side of the liquid crystal cell and the principal optic axis direction of the optical compensation layer B, the optical compensation layer B being disposed on each side of the liquid crystal cell appropriately selected depending on the optical characteristics and the finally required viewing angle characteristics of the liquid crystal cell to be used. The most significant effect of improving viewing angle characteristics is obtained when the upper side direction of the principal optic axis of the optical compensation layer B as viewed from the light outgoing side of the liquid crystal cell is set to about +180° with respect to the rubbing direction of the liquid crystal cell substrate disposed close to the light incident side and the light outgoing side of the liquid crystal cell, provided that the counterclockwise direction viewed from the light outgoing side of the liquid crystal cell is defined as positive.

Furthermore, in the lamination structure of the optical compensation layers of the present invention, the effect of improving the viewing angle characteristics significantly depends on the relationship between the rubbing direction of the substrate on the light incident side and the light outgoing side of the liquid crystal cell and the direction of the slow axis of the layer (optical compensation layer C) comprising at least one optical compensation layer having optically positive refractive index anisotropy and having a uniaxial alignment characteristic. The direction of the slow axis is appropriately selected depending on the optical characteristics and the finally required viewing angle characteristics of the liquid crystal cell to be used. The more significant effect of improving viewing angle characteristics can be obtained when the direction of the slow axis is set approximately perpendicular to the rubbing direction of the liquid crystal cell substrate disposed close to the light incident side and the light outgoing side of the liquid crystal cell.

The directions of the absorption axes of the polarizing films on both sides of the cell are selectively determined to be approximately vertical (E mode) or approximately parallel (O mode) with respect to the rubbing direction of the liquid crystal cell substrate close to the light incident side and the light outgoing side depending on the finally required optical characteristics of the LCD.

In the present invention, the retardation values ($R_A$, $R_A'$, $R_B$ and $R_C$) of the optical compensation layers and the tilting directions of the optical axes are obtained by measurements on the basis of ordinary methods known to those people skilled in the art.

According to the present invention, TN-LCDs having significantly improved viewing angle characteristics of display contrast and gray scale inversion can be provided.

EXAMPLES

The present invention will be explained in detail by way of the following examples.

Example 1

Based on a method described in Japanese Laid-open Patent Publication No. 5-196819, an optical compensation layer A1 was formed having almost no refractive index anisotropy in-plane of the film and having a characteristic wherein the refractive index in the thickness direction of the film was lower than that in-plane of the film. The retardation values of the optical compensation layer A1 were $R_A$=7 nm and $R_A'$=56 nm.

Based on a method described in WO96/10773, an optical compensation layer B1 was formed having optically positive refractive index anisotropy and having a characteristic wherein the principal optic axis thereof was tilted from the normal direction of the film. The tilting angle of the optical compensation layer B1 was θ=30° and the retardation value thereof was $R_B$=35 nm.

A TN-LCD was produced by laminating the above-described two kinds of optical compensation layers between the liquid crystal cell and the polarizing films disposed on both sides thereof in a TFT-TN liquid crystal television (CRYSTALTRON, 4E-L1) made by Sharp Corporation in the following order: the polarizing film (11), the optical compensation layer A1 (13), the optical compensation layer B1 (15), the liquid crystal cell (19) the optical compensation layer B1 (16) the optical compensation layer A1 (14) and the polarizing film (12).

FIG. 1 is a schematic, expanded view of the liquid crystal display of the Example which shows the optical axis directions of each optical compensation layer, the rubbing directions of the substrates of the liquid crustal cell, and the absorption axes of the light polarizing films of upper and lower sides of the liquid crystal display.

At this time, the upper side direction of the principal optic axis (23, 24) of the optical compensation layer B1 (15, 16) as viewed from the light outgoing side of the liquid crystal cell (19) was set to +180° with respect to the rubbing direction (27, 28) of the liquid crystal cell (19) substrate disposed close to the light incident side and the light outgoing side of the liquid crystal cell.

In this TN-LCD, white display, black display and gray scale display of eight gray levels were performed with VG365N video pattern generator made by AMT Corporation, and contrast ratio at the time of the white/black display and gray scale inversion at the time of the gray scale display of eight gray levels were measured within a range of 60° in the upper, lower, left and right directions with LCD-7000 made by Otsuka Electronics Co., Ltd.

The angles where gray scale inversion occurs in the upper, lower, left and right directions are shown in Table 1. In this LCD, the viewing angle characteristics of both display contrast and gray scale inversion were excellent in all of the upper, lower, left and right directions. Thus, the LCD is far more excellent than conventional TN-LCDs.

Example 2

Based on the method described in Japanese Laid-open Patent Publication No. 5-196819, the optical compensation layer A1 was formed having almost no refractive index anisotropy in-plane of the film and having a characteristic wherein the refractive index in the thickness direction of the film was lower than that in-plane of the film. The retardation values of the optical compensation layer A1 were $R_A$=7 nm and $R_A$=56 nm.

Based on the method described in WO96/10773, an optical compensation layer B2 was formed having optically positive refractive index anisotropy and having a characteristic wherein the principal optic axis thereof was tilted from the normal direction of the film. The tilting angle of the optical compensation layer B2 was θ=35° and the retardation value thereof was $R_B$=24 nm.

A TN-LCD was produced by laminating the above-described two kinds of optical compensation layers between the liquid crystal cell and the polarizing films disposed on both sides thereof in a TFT-TN-LCD equipped notebook personal computer (PC9821 La10) made by NEC Corporation in the following order: the polarizing film, the optical compensation layer A1, the optical compensation layer B2, the liquid crystal cell, the optical compensation layer B2, the optical compensation layer A1 and the polarizing film.

At this time, the upper side direction of the principal optic axis of the optical compensation layer B2 as viewed from the light outgoing side of the liquid crystal cell was set to +180° with respect to the rubbing direction of the liquid crystal cell substrate disposed close to the light incident side and the light outgoing side of the liquid crystal cell.

In this TN-LCD, white display, black display and gray scale display of eight gray levels were performed by computer software, and contrast ratio at the time of the white/black display and gray scale inversion at the time of the gray scale display of eight gray scales were measured within a range of 60° in the upper, lower, left and right directions with LCD-7000 made by Otsuka Electronics Co., Ltd.

The angles where gray scale inversion occurs in the upper, lower, left and right directions are shown in Table 1. In this LCD, the viewing angle characteristics of both display contrast and gray scale inversion were excellent in all of the upper, lower, left and right directions. Thus, the LCD is far more excellent than conventional TN-LCDs.

Example 3

Based on the method described in Japanese Laid-open Patent Publication No. 5-196819, the optical compensation layer A1 was formed having almost no refractive index anisotropy in-plane of the Film and having a characteristic wherein the refractive index in the thickness direction of the film was lower than that in-plane of the film.

Figure 2:
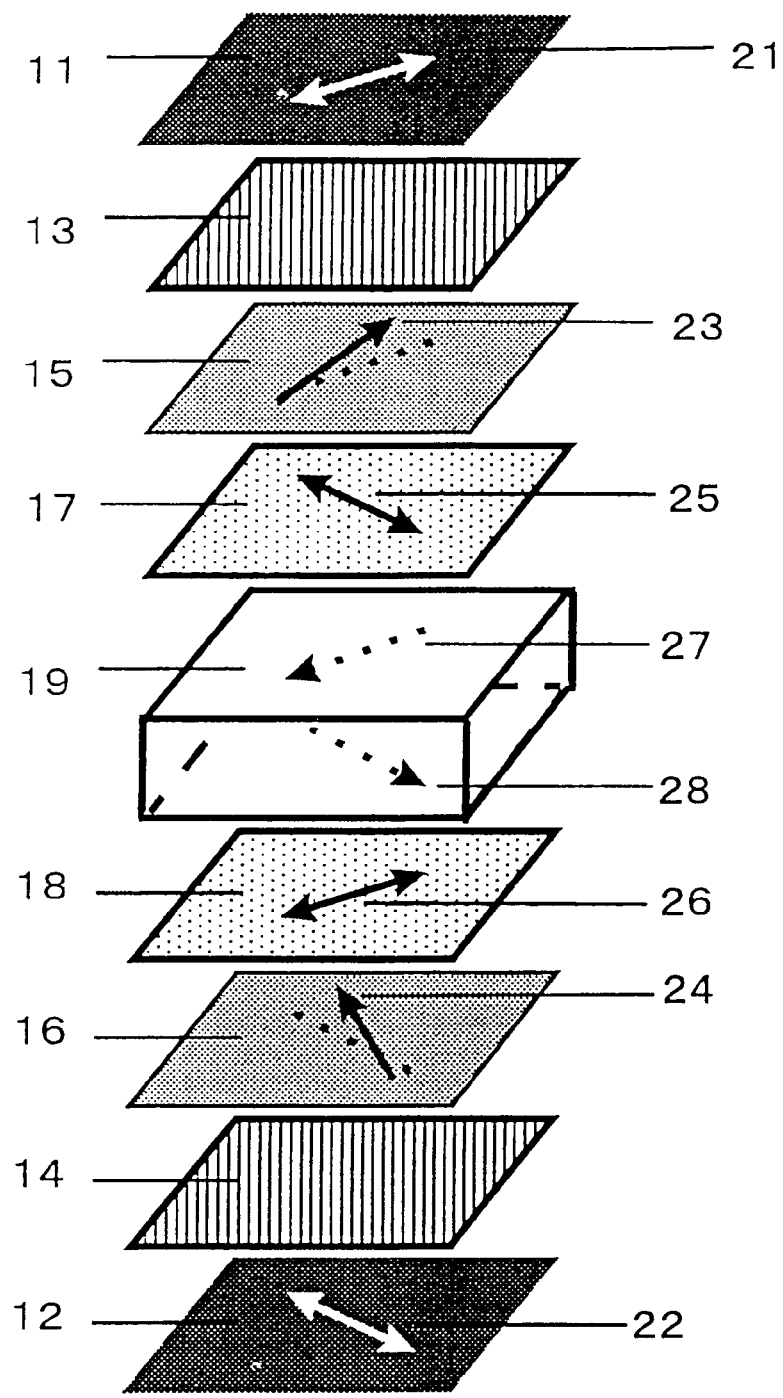
FIG. 2 is a schematic, expanded view of the liquid crystal display in Example 3, which shows the optical axis directions of each optical compensation layer, the rubbing directions of the substrates of the liquid crystal cell, and the absorption axes of light polarizing films of upper and lower sides of the liquid crystal display.

FIG. 2 is a schematic, expanded view of the liquid crystal display of this Example which shows the optical axis directions of each optical compensation layer, the rubbing directions of the substrates of the liquid crystal cell, and the absorption axes of the light polarizing films of upper and lower sides of the liquid crystal display. The retardation values of the optical compensation layer A1 were $R_A$=7 nm and $R_A$=56 nm.

Based on the method described in WO96/10773, the optical compensation layer B2 was formed having optically positive refractive index anisotropy and having a characteristic wherein the principal optic axis thereof was tilted from the normal direction of the film. The tilting angle of the optical compensation layer B2 was θ=35° and the retardation value thereof was $R_B$=24 nm.

A uniaxial optical compensation layer C1 having optically positive refractive index anisotropy was formed by uniaxially stretching a polycarbonate film formed by the solvent cast method. The retardation value of the optical compensation layer C1 was $R_C$=46 nm.

A TN-LCD was produced by laminating the above-described three kinds of optical compensation layers between the liquid crystal cell and the polarizing films disposed on both sides thereof in the TFT-TN-LCD equipped notebook personal computer (PC9821 La10) made by NEC Corporation in the following order: the polarizing film (11), the optical compensation layer A1 (13), the optical compensation layer B2 (15), the optical compensation layer C1 (17), the liquid crystal cell (19), the optical compensation layer C1 (18), the optical compensation layer B2 (16), the optical compensation layer A1 (14) and the polarizing film (12).

At this time, the upper side direction of the principal optic axis (23, 24) of the optical compensation layer B2 (15, 16) as viewed from the light outgoing side of the liquid crystal cell (19) was set to +180° with respect to the rubbing direction (27, 28) of the liquid crystal cell substrate disposed close to the light incident side and the light outgoing side of the liquid crystal cell, and the direction of the slow axis (25, 26) of the optical compensation layer C1 (17, 18) was set perpendicular to the rubbing direction (27, 28) of the liquid crystal cell substrate disposed close to the light incident side and the light outgoing side of the liquid crystal cell (19).

In this TN-LCD, white display, black display and gray scale display of eight gray levels were performed by computer software, and contrast ratio at the time of the white/black display and gray scale inversion at the time of the gray scale display of eight gray scales were measured within a range of 60° in the upper, lower, left and right directions with LCD-7000 made by Otsuka Electronics Co., Ltd.

The angles where gray scale inversion occurs in the upper, lower, left and right directions are shown in Table 1. In this LCD, the viewing angle characteristics of both display contrast and gray scale inversion were excellent in all of the upper, lower, left and right directions. Thus, the LCD is far more excellent than conventional TN-LCDs.

Comparative Example 1

A TN-LCD having three kinds of optical compensation layers laminated therein was produced in a manner similar to that of Example 3 except that the optical compensation layers were laminated in the following order: the polarizing film, the optical compensation layer C1, the optical compensation layer B2, the optical compensation layer A1, the liquid crystal cell, the optical compensation layer A1, the optical compensation layer B2, the optical compensation layer C1 and the polarizing film.

In this TN-LCD, white display, black display and gray scale display of eight gray levels were performed by computer software.

In this TN-LCD, although the viewing angles of display contrast in the left, right and lower directions were excellent, but the angle in the upper direction was inferior, and the viewing angle characteristic of gray scale inversion was not very excellent in any of the upper, lower, left and right directions.

Comparative Example 2

A TN-LCD was produced where in the TN-LCD of Example 3, the optical compensation layers were not used but only the polarizing films were mounted.

In this TN-LCD, white display, black display and gray scale display of eight gray levels were performed by computer software, and contrast ratio at the time of the white/black display and gray scale inversion at the time of the gray scale display of eight gray scales were measured within a range of 60° in the upper, lower, left and right directions with LCD-7000 made by Otsuka Electronics Co., Ltd.

The angles where gray scale inversion occurs in the upper, lower, left and right directions are shown in Table 1. In this TN-LCD, the viewing angle of display contrast and the viewing angle characteristic of gray scale inversion were not very excellent in any of the upper, lower, left and right directions.

TABLE 1

| | Angle where gray scale inversion occurs | | | |
|---|---|---|---|---|
| | Upper | Lower | Left | Right |
| Example 1 | 39° | 45° | 59° | 52° |
| Example 2 | 35° | 20° | 50° | 50° |
| Example 3 | 35° | 15° | 60° or greater | 60° or greater |
| Comparative example 2 | 30° | 5° | 27° | 30° |

What is claimed is:

1. A normally white mode liquid crystal display device comprising an about 90° twisted nematic liquid crystal cell and a first and a second light polarizing films separately disposed on two sides of said liquid crystal cell, a first and a second optical compensation layers A, which each comprises at least one optical compensation layer and has almost no refractive index anisotropy in-plane of the optical compensation layer A and has a characteristic wherein a refractive index in the thickness direction of the optical compensation layer A is lower than the refractive index in-plane of the optical compensation layer A, and a first and a second optical compensation layers B, which each comprises at least one optical compensation layer and has optically positive refractive index anisotropy and has a characteristic wherein a principal optic axis of the optical compensation layer B is tilted 25 to 70° from the normal direction of the optical compensation layer B, wherein said liquid crystal cell, said first and second light polarizing films and said optical compensation layers A and B are laminated in the following order: said first light polarizing film, said first optical compensation layer A, said first optical compensation layer B, said liquid crystal cell, said second optical compensation layer B, said second optical compensation layer A and said second light polarizing film, and as viewed from a light outgoing side of said liquid crystal cell, an upper side direction of the principal optic axis of said first and second optical compensation layers B is set to about +180° with respect to a rubbing direction of liquid crystal cell substrate disposed close to a light incident side and the light outgoing side of said liquid crystal cell.

2. A liquid crystal display device according to claim 1, further comprising a first and a second optical compensation layers C, which each comprises at least one uniaxial optical compensation layer and has an optically positive refractive index anisotropy, and which are laminated between each of the first and second optical compensation layers B and the liquid crystal cell of the liquid crystal display device in the following order: said first light polarizing film, said first optical compensation layer A, said first optical compensation layer B, said first optical compensation layer C, said liquid crystal cell, and said second optical compensation layer C, said second optical compensation layer B, said second optical compensation layer A and said second light polarizing film, and as viewed from a light outgoing side of said liquid crystal cell, an upper side direction of the principal optic axis of said first and second optical compensation layers B is set to about +180° with respect to a rubbing direction of liquid crystal cell substrate disposed close to a light incident side and the light outgoing side of said liquid crystal cell.

3. A liquid crystal display device according to claim 2, wherein the direction of a slow axis of said first and second optical compensation layers C is set approximately perpendicular to a rubbing direction of liquid crystal cell substrate disposed close to a light incident side and a light outgoing side of said liquid crystal cell.

* * * * *